United States Patent [19]
Edwards

[11] 3,776,114
[45] Dec. 4, 1973

[54] PHOTOGRAPHIC APPARATUS
[75] Inventor: Evan A. Edwards, Pittsford, N.Y.
[73] Assignee: Eastman Kodak Company, Rochester, N.Y.
[22] Filed: Mar. 2, 1972
[21] Appl. No.: 231,438

Related U.S. Application Data
[62] Division of Ser. No. 25,848, April 6, 1970, Pat. No. 3,684,206.

[52] U.S. Cl. ............ 95/31 FM, 95/31 R, 95/31 CA, 352/92
[51] Int. Cl. .......................................... G03b 19/04
[58] Field of Search .......... 95/31 R, 31 CA, 31 FM; 352/78, 92, 174, 236

[56] References Cited
UNITED STATES PATENTS

| | | | |
|---|---|---|---|
| 3,515,473 | 6/1970 | Theer et al. | 352/92 |
| 3,568,584 | 3/1971 | Harvey | 352/92 |
| 1,698,106 | 1/1929 | Owens | 352/92 |
| 3,552,841 | 1/1971 | Michelson | 352/92 |
| 3,246,817 | 4/1966 | Floden | 352/174 |

Primary Examiner—Samuel S. Matthews
Assistant Examiner—Russell E. Adams
Attorney—Robert W. Hampton

[57] ABSTRACT

In a double compartment roll film cartridge loaded with an elongate strip of film protected by a strip of backing paper, the leading end of the paper extends from a roll of film and paper in the film supply compartment into the film take-up compartment where it is connected to a winding core. The leading end of the film lies along the corresponding portion of the paper but is not fixed or otherwise positively attached to the paper. As the core is rotated, the film is moved by frictional engagement with the paper and is wound about the core between alternate convolutions of the paper. The backing paper has a camera lock up perforation, and a metering system in a camera for receiving the cartridge arrests advancement of the film by sensing the perforation while the trailing ends of both the film and paper are in the film passageway leading into the take-up compartment, thereby improving light-tightness of the passageways leading into the two compartments.

8 Claims, 10 Drawing Figures

PATENTED DEC 4 1973

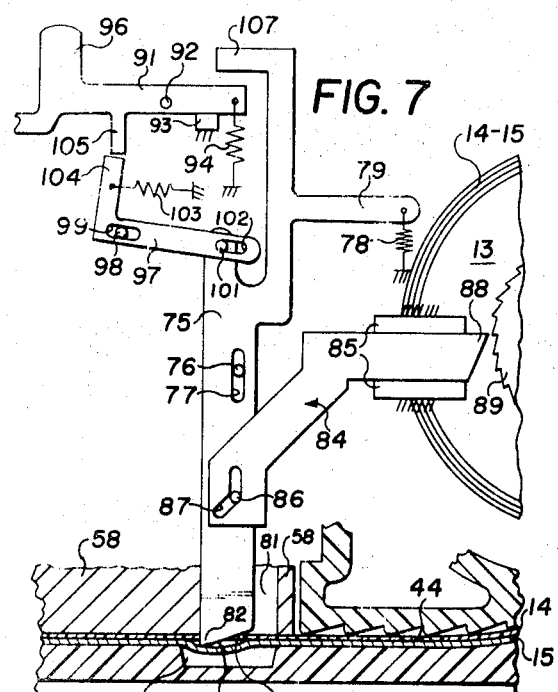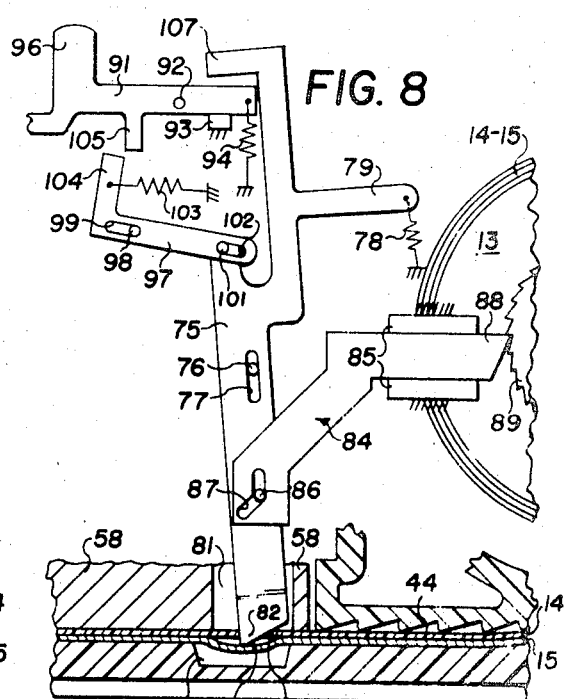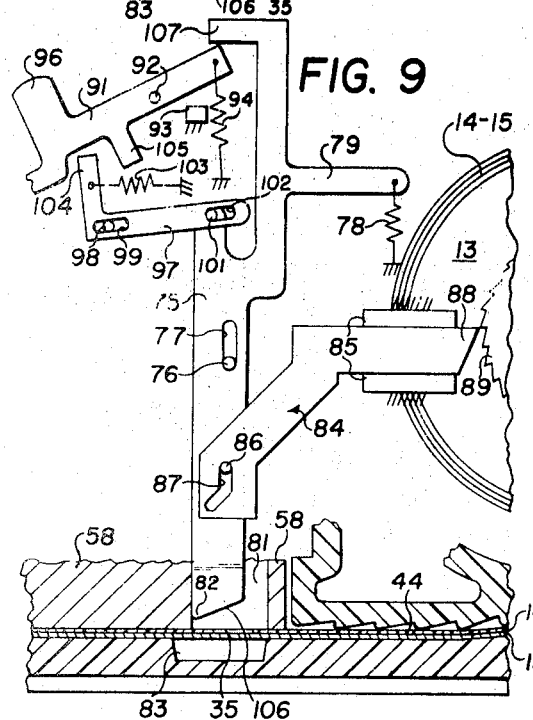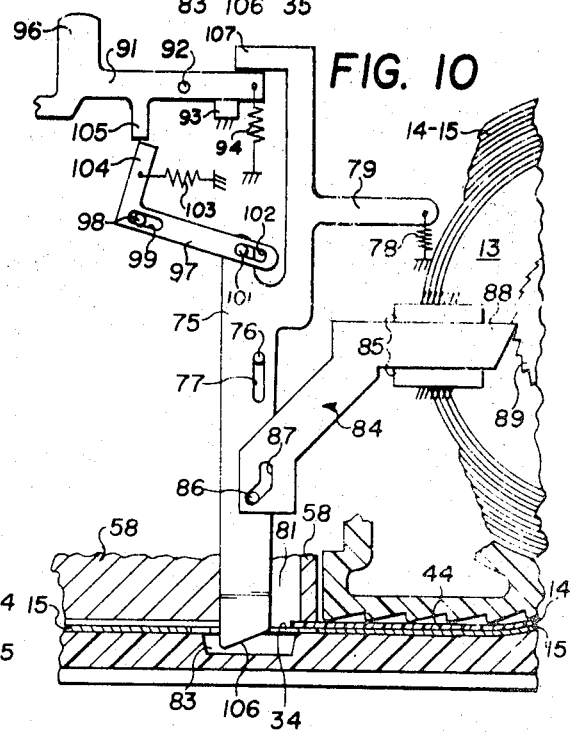

PHOTOGRAPHIC APPARATUS

This application is a division of application Ser. No. 25,848 filed Apr. 6, 1970 now U.S. Pat. No. 3,684,206.

BACKGROUND OF THE INVENTION

1. Field of the Invention

The present invention relates to photography and particularly to apparatus such as a still camera using roll film.

2. Description of the Prior Art

It has long been known to load photographic apparatus such as still cameras with film cartridges in which a strip of film is advanced intermittently from a film supply compartment and wound onto a winding core within a film take-up compartment as successive exposures are made on the portion of the strip of film extending between the two compartments. In any such cartridge using radiation sensitive material it is, of course, important to prevent light from entering the internal film chambers defined by the two compartments, through the corresponding film passageways leading into the compartment. Consequently, in cartridges in which the leading end of a strip of film is attached directly to the winding core without benefit of a protective backing web, the film passageways are designed to receive the film as snugly as possible without impairing longitudinal movement of the film.

To provide greater protection to the film and to provide visible exposure indicia along the film, a radiation protective paper backing strip extending beyond both ends of the film also may be used. As disclosed in greater detail in commonly assigned U.S. Pat. Nos. 3,138,081 and 3,138,084, the film and paper are wound initially within the film supply chamber of the cartridge, with the leading end of the film attached to the paper by a paster tab comprising a strip of pressure sensitive tape or the like. The leading end of the paper extends through the passageway leading into the film take-up chamber and is permanently attached to a rotatable winding core. As the core is rotated, the paper draws the film between the two chambers until the leading end of the film reaches the core, whereupon both the film and the paper are wound onto the core in alternate layers.

Since the opposed areas of the surfaces of the film passageways confronting the film and paper must be spaced apart by a distance sufficient to permit the paster tab to pass, a degree of light leakage in these passageways is possible, both when the paster is not in the passageway and particularly when the take-up chamber passageway is empty after the film and paper have been wound onto the core.

SUMMARY OF THE INVENTION

It is an object of the present invention to provide, in a camera having a film advancing mechanism for advancing film past an exposure station in single frame increments, a metering mechanism, operative on an elongate film product having a discontinuity for indicating use of the last film frame thereon, which locks the film advancing mechanism to prevent further film advancement when the discontinuity is sensed.

A further object of the present invention is the provision of a metering mechanism of the aforementioned type which additionally locks the camera exposure making means when the discontinuity is sensed.

In accordance with a preferred embodiment of the present invention, a film magazine or cartridge is provided with an elongate web comprising a filmstrip and a paper backing strip. The trailing end of the film or preferably the backing paper is provided with a lock up discontinuity such as a notch. After the film has been completely exposed in the camera, the film metering mechanism senses the lock-up perforation to arrest further operation of the film winding device and the shutter operating trigger. In this condition, the trailing ends of the film and paper both remain in the film take-up chamber passageway. Hence, protection is provided against undesired exposure of the film to light both before and after the cartridge is used.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawing, in which:

FIG. 7 corresponds to FIG. 6 and illustrates the respective positions of the metering mechanism components as a metering hole in the filmstrip initially comes into alignment with the metering pawl;

FIG. 8 corresponds to FIGS. 6 and 7 and shows the respective positions of the illustrated metering mechanism components as the movement of the film beyond the position shown in FIG. 7 results in arresting further advancement of the film;

FIG. 9 corresponds to FIGS. 6 through 8 and illustrates the respective positions of the metering mechanism components as the shutter is operated to effect an exposure and to restore the metering mechanism to the condition shown in FIG. 6; and FIG. 10 corresponds to FIGS. 6 thgough 9 and illustrates the respective positions of the components when the trailing end of the filmstrip has moved past the metering pawl.

DESCRIPTION OF THE PREFERRED EMBODIMENT

Figures 1, 2, 3:
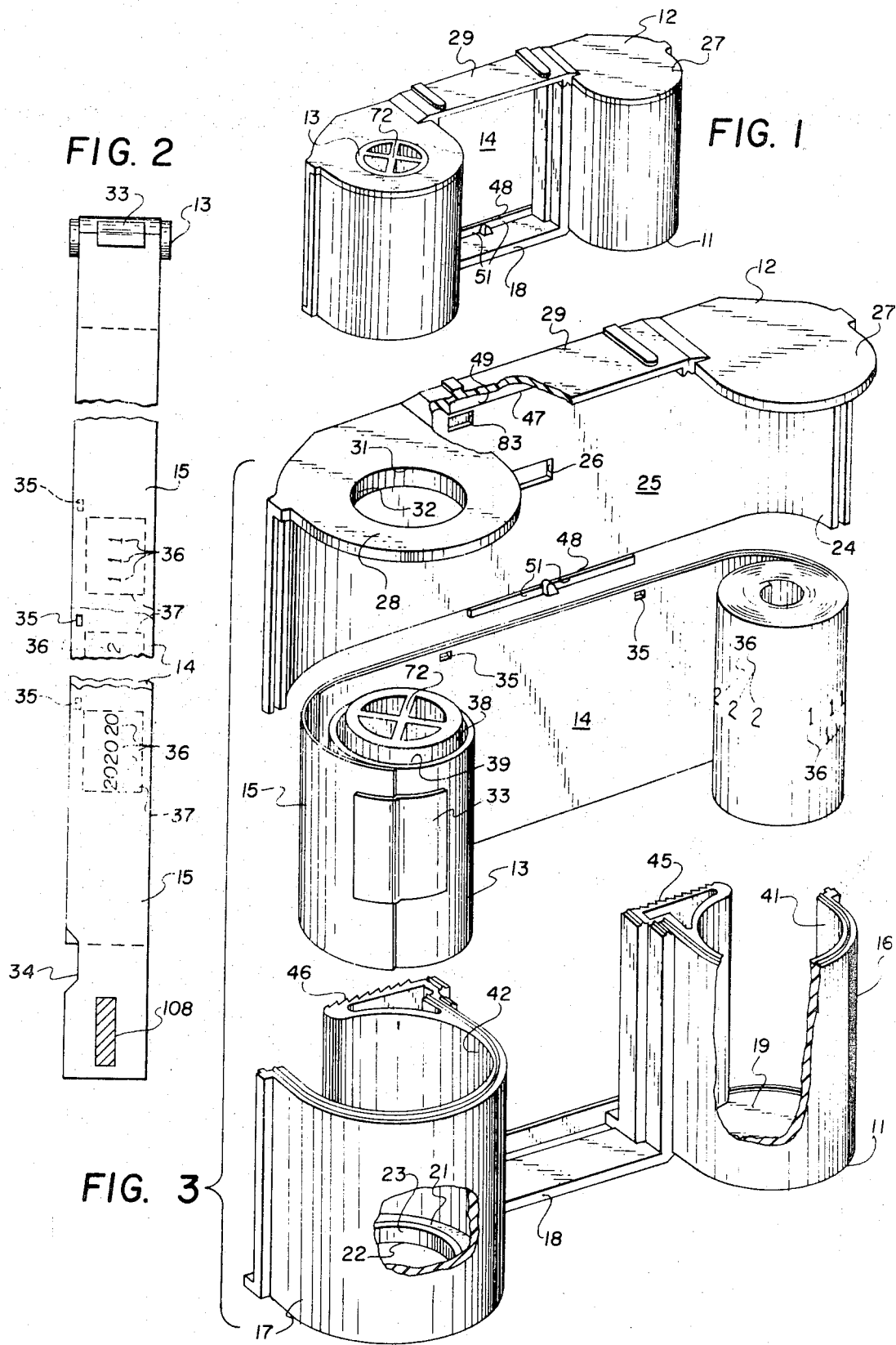
FIG. 1 is a perspective front view of a film cartridge for use in a camera according to the invention.
FIG. 2 is a plan view of the film product employed in the cartridge shown in FIG. 1.
FIG. 3 is an enlarged, exploded front perspective view of the film cartridge shown in FIG. 1 with portions of the cartridge structure broken away.

Because cameras are well known, the present description will be directed in particular to camera elements forming part of, or cooperating more directly with, the present invention. It is to be understood that camera elements not specifically shown or described herein are selectable from those known in the art.

As shown in FIGS. 1–4, a film magazine or cartridge embodying the present invention comprises a first or lower casing member 11, a second or upper casing member 12, a film winding core 13, an elongate web of photographic material comprising an elongate strip of film 14 and an elongate strip of opaque, protective backing material or paper 15. The lower casing member suitably is formed of molded plastic and includes a film supply compartment member 16 and a film take-up compartment member 17, joined together by a lower wall member 18. The lower ends of both film compartment members are closed by end wall members 19 and 21, respectively, with the take-up compartment containing an inwardly extending annular lip 23 for rotatably supporting the winding core 13. The upper casing member also is preferably formed of molded plastic material and comprises a relatively thick back wall member 24 curved forwardly toward its opposite ends from a flat film gate surface 25 surrounding a rectangular aperture 26. Cover members 27 and 28, which close the upper ends of the respective film supply and take-up compartment members, extend forwardly from the top edge of the back wall member and are joined by upper wall member 29 corresponding to lower wall member 18. Cover member 27 is entirely imperforate, whereas cover member 28 is provided with an opening 31 surrounded by an inwardly projecting lip 32 to permit one end of winding core 13 to be exposed.

As depicted in FIGS. 2 and 3, the film product employed in the subject cartridge comprises the cylindrical molded plastic winding core 13, to which the leading end of the elongate strip of protective backing paper 15 is attached by a piece of pressure sensitive tape 33 or other appropriate means. As previously described, the backing paper 15 is superimposed on the filmstrip 14 with the leading end of the film adjacent the winding core and with the trailing end of the film partially overlapping an edge notch 34 in the backing paper. Along its upper edge, the filmstrip is provided with a set of discontinuities comprising a series of uniformly spaced metering holes 35 along the same line as the backing paper notch 34. As later described, a metering pawl incorporated in the camera's film advancing mechanism cooperates with holes 35 to control advancement of the film in the camera and with notch 34 to lock up the camera after the film has been exposed. The metering holes are associated with spaced reference numerals 36 or other indicia along the back surface of the backing paper behind the corresponding film exposure frames or areas indicated in broken lines at 37. Numbers 36 are visible through aperture 26 in the back wall member of the cartridge for exposure identification purposes.

When the cartridge is assembled, the adjacent surfaces of the upper and lower casing members are sealed together in light-tight relation to one another as described in greater detail in commonly assigned copending U.S. patent application Ser. No. 25,956, entitled "Film Cartridge and Camera," filed Apr. 6, 1970 in the name of Hubert Nerwin. The winding core is rotatably supported in the film take-up chamber by the reception of lip 23 of the lower casing member into a mating annular groove in the lower end hub of the core, and by the reception of the corresponding opposed inwardly facing lip 32 surrounding opening 31 a like mating annular groove in the hub member as shown at numeral 39 in FIG. 3, thereby providing labyrinth light barriers at both open ends of core member 38. Accordingly, it will be seen that this construction provides film supply and take-up chambers 41 and 42 which are light-tight except along film passageways shown at 43 and 44 in FIG. 5. These passageways are defined between the rearwardly facing wall surfaces 45 and 46 of the lower casing member and the corresponding forwardly curved end surfaces of back wall member 24.

Figure 5:
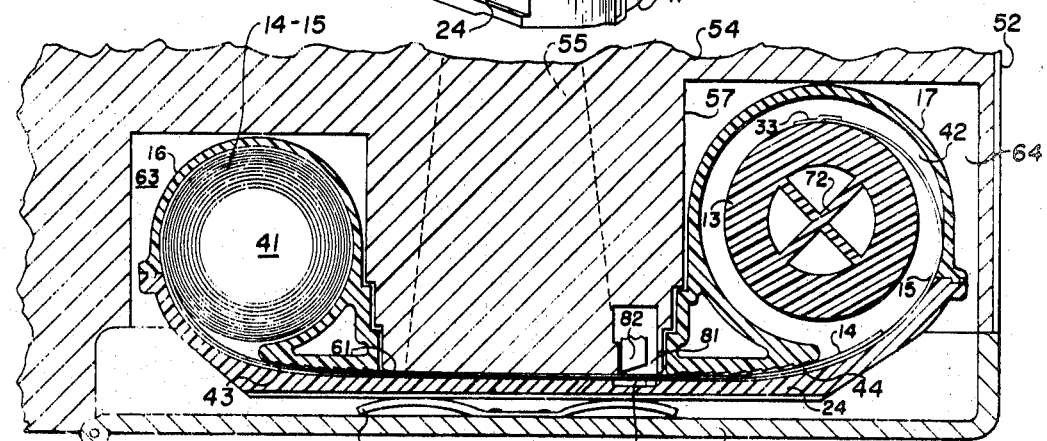
FIG. 5 is a cross-sectional partial plan view of the loaded camera taken through the camera and cartridge along the line 5—5 of FIG. 4.

Initially, the main portions of the film 14 and backing paper 15 is wound within the film supply compartment as shown in FIGS. 3 and 5, with the leading end of the film 14 and the corresponding portion of the paper 15 extending through the film passageways. As previously indicated, these passageways are just large enough to accommodate the film and paper while permitting longitudinal movement of the film and paper, thus minimizing the possibility of light entering the film chambers past the film and paper in the passageways. Also, the subject film 14 and paper 15 preferably have same width so that their aligned edges mate closely with the corresponding top and bottom passageway surfaces. To further improve the light sealing effectiveness of the film and paper within the passageways, the rearwardly facing wall surfaces 45 and 46 may be provided with transverse grooves, as illustrated, thereby preventing grazing reflection of light along the passageways between those wall surfaces and the emulsion surface of the film. It will be understood, of course, that references herein to film passageway sizes or to distances between opposed surfaces thereof refer to effective sizes or distances as determined by those passageway surfaces contacting the film or paper; e.g., the rearwardly facing apexes of the illustrated grooved surfaces 45 and 46. As disclosed in commonly assigned copending U.S. patent application Ser. No. 700,055 entitled "Method and Apparatus for Improving the Flatness of Roll Film in a Camera Exposure Aperture," filed in the name of Hubert Nerwin or Jan. 24, 1968, the film passageways preferably define a gradually curved film path between the film chambers and the back film gate surface 25, in order thereby to minimize distortive influences imparted to the film by abrupt curvaature transitions. Also, the size of the film supply chamber in relation to the diameter of the winding core is disclosed more specifically in commonly assigned U.S. patent application Ser. No. 25,864, entitled "Elimination of Backing Paper Shortage in Roll Film Magazines," filed in the names of Robert I. Edelman and Evan A. Edwards on Apr. 6, 1970 and now U.S. Pat. No. 3,614,012.

Between the two opposed film passageways, the film 14 and backing paper 15 extend along the flat back gate surfaces 25 of the cartridge wall member 24 between seating projections 47 and 48. These projections extend forwardly beyond surface 25 by a distance just slightly exceeding the combined thickness of the film and backing paper to provide a plurality of coplanar seating surfaces 49 and 51 forwardly of and parallel to surface 25. Since these seating projections are located beyond the edges of the portion of the film and paper between the two passageways, it will be seen that frontal access to the exposed portion of the film and paper is not obstructed by the magazine whenever the cartridge is removed from the camera.

Since the portion of the film 14 extending between the two compartments 16 and 17 is held in guided engagement with the corresponding portion of the paper 15 by the film passageways and the intermediate film exposure gate structure, the leading end of the film 14 is substantially immovable relative to the adjacent portion of the backing paper 15. Accordingly, as the paper 15 winds onto the winding core 13, the leading end of the film 14 enters the nip between the backing paper and the core and also is wound onto the core beneath the paper. During further rotation of the core, the tension developed in the convoluted film and paper snubs the film tightly to the core so that the film is, in effect, securely attached.

Figure 4:
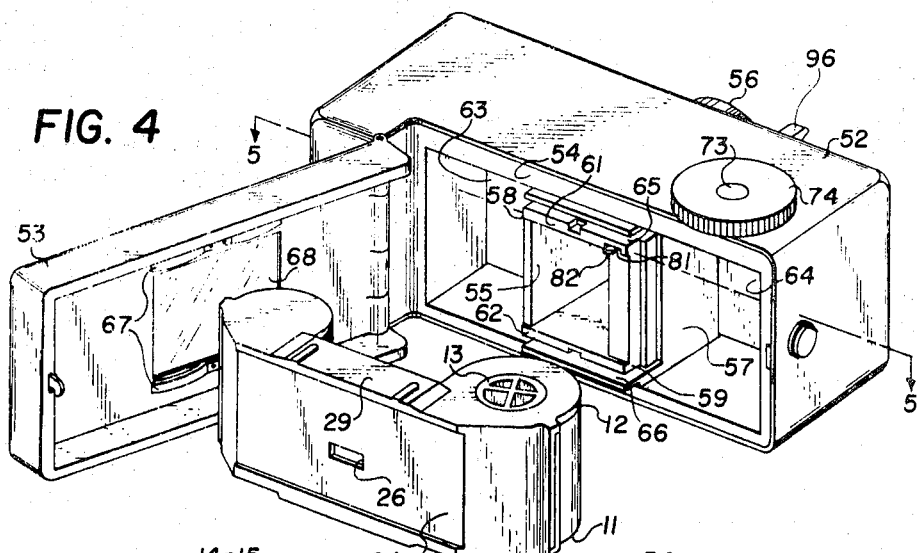
FIG. 4 is a rear perspective view of an open camera according to the illustrative preferred embodiment of the invention and of the film cartridge illustrated in the preceding figures in position for insertion into the camera.

The camera illustrated in FIGS. 4 and 5 includes an exterior housing comprising a front casing member 52 provided with a hinged rear cover door 53 that closes the housing when latched in the closed position as partially illustrated in FIG. 5. An internal body member 54 is housed within the front casing member and includes a tapered rectangular opening 55 extending rearwardly from the camera's lens system and shutter, not shown, which are mounted in lens housing 56 and together comprise the exposure or operating station. Opening 55 is defined by an open ended boxlike structure 57 provided with a pair of rearwardly facing support rails 58 and 59. The rearwardly facing front gate surfaces 61 and 62 defined by the respective support rails 58 and 59 are in a common plane having a predetermined relation with a focal plane onto which the camera lens system focuses the image of an object within a given distance range from the camera.

When the cartridge is installed in the camera, its film supply and take-up compartments occupy corresponding receptacles 63 and 64 in the body member. Receptacles 63 and 64 are joined by horizontal channels 65 and 66 above and below the opening 55, such channels accommodating the upper and lower wall members 29 and 18 of the cartridge with the boxlike structure 57 being received between wall members 29 and 18 and between the two film compartments 16 and 17. The cover door 53 of the camera is provided with a pair of resilient spring members 67 above and below a transparent cover door window 68. When the cover door is closed, these spring members engage corresponding rearwardly facing surfaces of the magazine to urge the latter forwardly in the camera.

The various elements of the magazine and the internal camera structure which cooperate to support the magazine and to define a light-tight film gate between the two film compartments are disclosed in detail in the above-identified Nerwin application Ser. No. 25,956 filed on even date herewith. For purposes of the present disclosure, however, the rearwardly facing surfaces 61 and 62 of the camera support rails 58 and 59 are engaged by the cartridge seating projections 47 and 48 under the influence of spring members 67, and that the edges of surfaces 61 and 62 adjacent opening 55 overlap the correspnding edge portions of the emulsion surface of the film extending between the two film compartments. Accordingly, since the seating projections extend forwardly beyond surface 25 by a distance slightly exceeding the combined thickness of the film and paper, it will be apparent that front emulsion surface of the exposure portion of the film aligned with opening 55 is supported at the focal plane of the camera lens system by the exposure gate structure comprising the fowardly facing cartridge surface 25 and the rearwardly facing regions of support rails 58 and 59 overlapping the edges of the film.

The film advancing system of the subject camera includes a winding key (not shown) which is adapted to engage the internal splines 72 shown in FIG. 5 at the upper end of winding core 13 when the cartridge is loaded into the camera. The winding key, is carried by rotatable winding shaft 73 attached to winding knob 74 shown in FIG. 4, whereby the manual rotation of the knob in a counterclockwise direction winds film and paper onto the core. The winding key is, of course, movable into and out of engagement with the winding core, either by manually operated means or by any known mechanism of the type which automatically effects such movement in response to corresponding movement of the camera's cover door.

The film metering mechanism incorporated with the film advancing system is housed within the internal body member of the camera above opening 55. As depicted in FIGS. 6 through 10, this mechanism according to the present invention includes a film engaging pawl member 75 supported by a stationary pin 76 extending through an elongate slot 77 in the pawl member. A light spring 78 attached to arm 79 of the pawl member 75 biases member 75 both rearwardly toward the film and in a clockwise direction around pin 76 thereby urging the rearward end of the pawl member into lateral contact with the adjacent surface of an opening 81 in support rail 58. The rearwardmost end of the pawl member defines a pawl tooth 82 which extends rearwardly through opening 81 into resilient engagement with the portion of the perforated upper edge of the filmstrip opposite recess 83 in the back wall member 24 of the cartridge.

Figure 6:
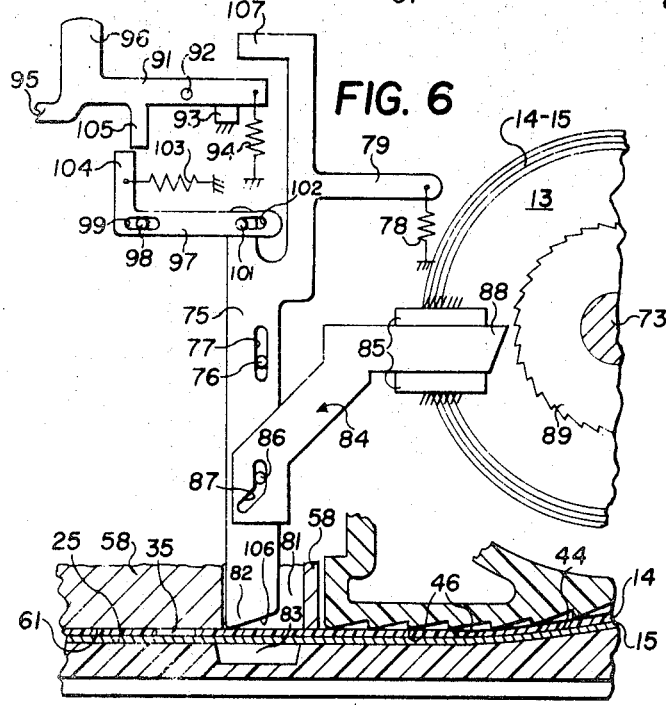
FIG. 6 is a schematic representation of the film metering mechanism employed in the camera shown in FIGS. 4 and 5, illustrating the position of the metering mechanism components during the initial movement of the film in response to rotation of the winding core.

When the cartridge is first installed in the camera, an imperforate area of the film spans the cartridge recess and maintains the metering pawl member against the influence of spring 78 in the position shown in FIG. 6. A dog member 84 is slidably supported between stationary guide lugs 85 and is attached to the pawl member 75 by a pin 86 projecting through an angular slot 87 in the end of the dog member 84 overlapping the pawl member 75. The opposite end of the dog member is pointed to provide a dog tooth 88 in aliggnment with a toothed wheel 89 attached to shaft 73 above the winding key. Due to the angular shape of slot 87, the tooth of the dog member is maintained out of engagement with wheel 89 whenever the pawl member is in the position illustrated in FIG. 6, thereby allowing the winding core to be rotated by means of knob 74.

Adjacent the forward end of the pawl member 75, a camera operating trigger lever 91 is pivotally supported by a fixed pin 92 and is biased in a clockwise direction against an abutment lug 93 by a spring 94. An arm of the trigger lever 91 partially shown at 95 is connected with the camera shutter or operating mechanism to actuate the latter when the trigger lever is moved manually to the position shown in FIG. 9 by means of the accessible pushbutton portion of the lever indicated at numeral 96. Behind the trigger lever, an L-shaped blocking arm 97 is pivotally and slidably supported by a stationary pin 98 extending through elongate slot 99 and is connected to the pawl member 75 by another pin 101 on that member extending through a second elongate slot 102 in the blockingarm 97. A spring 103 connected to the blocking arm urges it both in a clockwise direction and toward the pawl member 75. Thus, when the various elements of the metering mechanism are in their respective positions shown in FIG. 6, a forwardly extendingleg 104 of the blocking arm 97 is aligned with leg 105 extending rearwardly from the trigger lever 91 to prevent shutter operating movement of that lever.

As the initial movement of the film 14 and paper 15 is effected by counterclockwise rotation of the winding core, the various components of the metering mechanism remain in their respective positions depicted in FIG. 6 until the first meteringhole 35 in the film moves into alignment with the pawl tooth 82. When this occurs, the metering pawl 75 moves slightly rearwardly a predetermined amount under the influence of spring 78 to the position illustrated in FIG. 7, defined by engagement of the sloped rearward edge 106 of the pawl tooth 82 with the adjacent edge of the metering hole in which the tooth is partially received. In this position, the pawl tooth 82 locally displaces the imperforate area of the backing paper behind the metering hole but does not penetrate through the paper into recess 83. This limited rearward movement of the pawl 75, does not alter the position of the dog member 84. Also, although the blocking arm 97 is thereby pivoted about pin 98, leg 104 of that arm nevertheless remains in blocking alignment with leg 105 of the trigger lever to prevent operation of the shutter.

As the winding movement of the film continues, however, the metering hole 35 displaces the rearward end of the pawl member 75 toward the winding core, thereby sliding the dog member tooth 88 toward engagement with wheel 89 as depicted in FIG. 8 to disable the film advancing mechanism. As soon as such engagement occurs, the advancement of the film is positively arrested, with the film exposure area adjacent the first metering perforation thereby positioned in alignment with the camera lens system and with the corresponding reference numeral 36 visible through aperture 26 in the back wall member of the cartridge. Concurrently, the L-shaped blocking arm is displaced by the pawl member against the influence of spring 103 so that arm 104 no longer prevents pivotal movement of the trigger member to actuate the camera exposure mechanism.

An ear 107 at the forward end of the pawl member 75 is now located directly in the path of movement of the adjacent end of the trigger lever 91. Therefore, when the trigger lever 91 is pivoted manually to the position shown in FIG. 9 to operate the camera shutter, the end of the trigger lever 91 adjacent the pawl member 75 engages ear 107 and thereby moves the pawl member forwardly against the bias of spring 78. This movement of the pawl member 75 disengages pawl tooth 82 from the film 14 and causes pawl member 75 to assume the position shown in FIG. 9, in which the pawl tooth 82 is aligned with an imperforate area of the film immediately adjacent the metering hole 35 just vacated by that tooth. Upon the release of the trigger lever 91, spring 94 returns trigger lever 91 to its former position as leg 105 thereof bypasses the corresponding leg 104 of the blockking arm 97 by sliding that arm sideways in opposition to spring 103. Since ear 107 of the pawl member 75 is disengaged by the trigger lever 91 as the latter reassumes its initial position, the pawl tooth again engages the film 14, thus enabling the film advance mechanism by restoring the mechanism to its former condition shown in FIG. 6.

Consequently, the metering mechanism now allows the film to be advanced while at the same time preventing a second operation of the shutter until the next exposure area is moved into exposure position. During the subsequent operation of the camera, the metering mechanism functions in the same manner just described as each succeeding metering hole is engaged by the pawl member, thereby automatically positioning each successive film exposure area in the film exposure gate and preventing the occurrece of accidental double exposures.

After all of the available film exposure areas have been exposed, the rotation of the winding core by knob 74 moves the trailing end of the film 14 and the corresponding edge notch 34 in the backing paper 15 eventually into registration with opening 81, as shown in FIG. 10. Since the pawl member 75 then is no longer engaged with the film, pawl member 75 is moved by spring 78 to its rearwardmost position wherein pawl tooth 82 extends through the edge notch 34. Due to the angular shape of slot 87, this movement of the pawl member 75 slides the dog member 84 into blocking engagement with toothed wheel 89 to block further advancement of the film and paper. Therefore, the film advancing system is disabled from winding the trialing end portion of the film and the corresponding portion of the backing paper through the take-up chamber passageway. Concurrently, the corresponding position of the blocking arm 104 prevents the trigger from being operated to actuate the exposure mechanism, whereby both the shutter and the film advancing system remain disabled until the film cartridge is removed by the camera operation. As a result, the operator is aware that the camera is locked to prevent any further operation of the camera. With the film and backing paper so disposed within the cartridge, a distinctive indicia area along the backing paper shown at 108 in FIG. 2 is visible through cartridge aperture 26 and through the transparent cover door window 68 to indicate that the film in the cartridge has been completely exposed. It should be noted that the disabling means incorporated in the invention is distinguishable from that disclosed in U.S. Pat. No. 3,138,084, wherein the winding operation is stopped after the film has been wound onto the take-up spool by the engagement of a metering pin with a perforation in the trailing end of the backing paper. In the apparatus described herein, the film advancing system is actually disabled, rather than simply engaging the backing paper to prevent its movement. Upon removal of the cartridge from the camera, the trailing end portions of the film and backing paper continue to occupy the take-up chamber passageway, thereby effectively blocking that passageway against light which might otherwise damage the exposed film.

The invention has been described in detail with particular reference to a preferred embodiment thereof, but it will be understood that variations and modifications can be effected within the spirit and scope of the invention. For example, the film also may have a lock-up notch overlying the backing paper notch, in which case an additional length of film is accessible after the cartridge is removed. Alternatively, the metering mechanism may be used with film having no protective backing strip, in which case the film also includes the lock-up notch as described.

I claim:

1. A photographic camera comprising:

a. an exposure station;

b. operating means for making an exposure at said exposure station;

c. means for receiving an elongate composite web of photographic material including (1) a strip of film having exposure frames and being perforated at predetermined metering intervals and (2) a strip of radiation protection material having a discontinuity near the trailing end of said film strip d. means for advancing a received composite web of film and protection material past said exposure station to successively locate the exposure frames at said exposure station;

e. means for actuating said operating means; and f. a metering mechanism including 1. a pawl member having a pawl tooth engageable with the filmstrip and movable from a first position in which said tooth engages the filmstrip to a second position in which said tooth senses a perforation and to a third position in which said tooth senses the protective material strip discontinuity, 2. means operatively coupling said pawl member with said advancing means, for disabling said advancing means in response to movement of said pawl member to said second position, 3. releasing means, operatively coupling said pawl member with said actuating means, for enabling actuation of said operating means when said pawl member is in said second position and for preventing actuation when said pawl member is in said first position, said releasing means including means for moving said pawl member from said second position to said first position to enable filmstrip advancement, and 4. means responsive to movement of said pawl member to said third position for preventing actuation of said operating means and for disabling said advancing means.

2. The camera according to claim 1 wherein said pawl member is movable upon sensing perforation from said first position through an intermediate position in which said pawl tooth partially enters the perforation and from said intermediate position to the second position in response to movement of the filmstrip a predetermined amount in the direction of filmstrip advancement, and said releasing means withdraws said pawl tooth from the metering hole and returns said pawl member to said first position.

3. The camera according to claim 2 wherein said intermediate position is spaced from said first position a predetermined distance in a direction transverse to the direction of filmstrip advancement, and said third position is spaced from said first position in said transverse direction by an additional predetermined distance.

4. Apparatus operable to perform a photographic function, said apparatus comprising:

means for receiving an elongate film product (1) having a plurality of exposure areas, (2) being perforated at predetermined metering intervals, and (3) having a discontinuity near the trailing end of said film product;

an operating station;

means for advancing the received film product past said operating station to successively locate the exposure areas at said operating station;

means, including a member enterable into the perforations in the film product, for sensing perforations in the film product;

means responsive to said sensing means for disabling the advancing means to temporarily terminate advancement of the film product;

means actuatable for operating the apparatus after advancement has terminated;

means for enabling the advancing means to further advance the film product after actuation of said operating means;

means, including said member, for sensing the discontinuity in the film product; and means responsive to said discontinuity sensing means for terminating further advancement of the film product and for preventing actuation of the operating means.

5. For use with a film cartridge including a supply compartment, a take-up compartment, and an elongate film product transportable from the supply compartment, past an exposure position, and into the take-up compartment, the film product including photosensitive layer and a backing strip superimposed with the photosensitive layer and having a leading end and a trailing end, the backing paper having a discontinuity for indicating the proximity of the trailing end of the film product, a camera comprising:

means defining an exposure position;

means operable for exposing the photosensitive layer;

a trigger actuable for operating said exposing means;

means operable for transporting the film product from the supply compartment, past the exposure position, to the take-up compartment;

a first member movable between a first position and a second position wherein said first member prevents operation of said transporting means;

a second member movable between a first position and a second position wherein said second member locks said trigger against actuation; and a third member operatively coupled with said first and second members for moving said members between their respective positions and for sensing the presence of the discontinuity, said third member being movable from a first position wherein said first and second members are in their first positions, to a second position in response to the sensing of the discontinuity wherein said first and second members are in their second positions.

6. Apparatus according to claim 5 wherein said second member is integral with said pawl member.

7. In photographic apparatus having means for receiving an elongate film product having a plurality of exposure areas and a trailing end portion, a discontinuity associated with each area, and an additional discontinuity associated with the trailing end portion and having characteristics different from the characteristics of each exposure area discontinuity, the combination comprising:

an operating station;

means for advancing the received film product through said operating station to successively move the exposure areas to said operating station;

means for sensing the exposure area discontinuities and responsive to sensing of a discontinuity for disabling the advancing means to terminate advancement of the film product with the exposure area associated with the sensed discontinuity located at said operating station, said sensing and disabling means comprising:

a pawl member for engaging the received film product, and movable between a first position wherein said pawl member is in engagement with the surface of the film product, and a second position wherein said pawl member is in engagement with the discontinuity associated with an exposure area and a third position wherein said pawl member is disengaged from the film product, and a fourth position wherein said pawl is in engagement with the additional discontinuity; and a dog member coupled to said pawl member and movable to a position for disabling said advancing means in response to movement of said pawl member to said second position, means actuatable for operating the apparatus after advancement has terminated with an exposure area at said operating station, said operating means including means for moving said pawl means from said second position to said third position and for moving said dog member out of the disabling position, to enable the advancing means to further advance the film product after operation;

means for terminating further advancement and for preventing actuation of said operating means, said means comprising:

a locking member coupled to said pawl member and movable to a position for preventing actuation of the operating means in response to movement of said pawl member to said fourth position; and means for moving said dog member to said disabling position in response to movement of said pawl member to said fourth position.

8. Apparatus according to claim 7 wherein said operating means further comprises:

a trigger displaceable for actuating said operating means to effect exposure of the film product; and a blocking member coupled to said pawl member, said blocking member being movable to a position for preventing displacement of said trigger in response to movement of said pawl member to said first position, and movable to an inactive position in response to movement of said pawl member to said second position.

* * * * *